United States Patent [19] [11] 4,042,767
Payer et al. [45] Aug. 16, 1977

[54] PROCESS FOR POLYMERIZATION OF ETHYLENE
[75] Inventors: Wolfgang Payer; Volker Riepe; Wilhelm Zoller, all of Oberhausen, Germany
[73] Assignee: Ruhrchemie Aktiengesellschaft, Oberhausen, Germany
[21] Appl. No.: 656,133
[22] Filed: Feb. 9, 1976
[30] Foreign Application Priority Data
Feb. 26, 1975 Germany .............................. 2508284
[51] Int. Cl.$^2$ ....................... C08F 10/02; C08F 10/00
[52] U.S. Cl. ................................................... 526/64
[58] Field of Search ......................................... 526/64
[56] References Cited
U.S. PATENT DOCUMENTS
3,628,918 12/1971 Beals et al. .............................. 526/64

FOREIGN PATENT DOCUMENTS
1,010,847 11/1965 United Kingdom .................. 526/64

Primary Examiner—Alan Holler
Attorney, Agent, or Firm—Bierman & Bierman

[57] ABSTRACT

A method for avoiding decomposition of ethylene during polymerization in a tube form reactor having one or more side branches opening into the reactor wherein the diameter of the side branches is made to be not greater than about 12 mm and a flow number is maintained at between about 0.20 m$^2$/sec. and 0.55 m$^2$/sec, the flow number being defined as the product of the internal diameter of the tube reactor and the rate of flow of the reactant through the reactor. Flow numbers greater than 0.55 m$^2$/sec can be used as long as the diameter of the side branches is reduced to not more than 10 mm.

3 Claims, No Drawings

PROCESS FOR POLYMERIZATION OF ETHYLENE

This invention relates to the polymerization of ethylene, alone or with comonomers and, if necessary modifiers, in tube reactors at raised temperatures and pressures with the avoidance of decomposition of ethylene or of the polymerizate.

It is known that the polymerization of ethylene, which takes place according to a radical mechanism at raised temperatures and pressures, is exothermic (100 to 125 KJ/Mol) i.e. approx. 3,300 to 4,200 KJ of heat are released per kg of polyethylene. This enthalpy of formation must be withdrawn from the reaction mixture in order to maintain constant reaction conditions, which are decisive for the quality of the product.

The removal of the enthalpy of formation of polyethylene is, next to the control of the high working-pressure, one of the main technical process problems of the reaction.

The enthalpy of formation, which is released during the continuous polymerization of ethylene in a tube reactor, is transferred to a cooling medium surrounding the exterior tube wall. It is also used to heat up the reaction mixture prior to reaction.

The temperature of the reaction mixture can also be controlled further, by the introduction of cold gas, i.e. from cold ethylene alone or together with other heat-removal mediums and if necessary initiators or moderators.

The introduction of the cold gas takes place according to the reaction conditions, in measured amounts, at one or more places along the reactor. The polymerization is thereby optimized with regard to attaining higher conversions and improved product quality.

If the enthalpy of the reaction is not, or only partially, removed from the system, then the resulting superheating or heat congestion can lead to a decomposition of ethylene or of the polymerizate. Studies have shown that the addition of moderators, e.g. aliphatics such as saturated hydrocarbons, can noticeably extend the critical limit of the ethylene polymerization, above which an explosive ethylene decomposition can take place (Schonemann, Steiner, Kunststoffe, 57, 105 (1967). However, this can only be carried out to a limited extent, as these substances strongly affect the quality of the polyethylene.

The decomposition products of ethylene and polyethylene respectively are methane and carbon and hydrogen and carbon.

The resulting carbon is in the form of soot, and is finely distributed in the reactor and can only be removed with difficulty, so that upon decomposition, one not only suffers a lengthy break in production, but the subsequent production of inferior qualities of polyethylene must be expected. Furthermore, each decomposition causes a considerable strain on the reaction system, even when the greatest effects of the decompositions are minimized by safety devices.

In order to avoid superheating, it is extremely important to choose a correspondingly high flow velocity of the reaction mixture in the separate reaction zones of the tube reactor in order to establish sufficient turbulence in the reaction mixture so that the temperature profile is kept virtually constant over the cross-section of the tube reactor.

The temperature is kept below the characteristic level for the decomposition of ethylene or of the polyethylene mixture.

The required temperature profile of the cross-section of a tube reactor for the normal course of reaction is disturbed by the tube widening or by side branch openings on the reactor tube. Temperatures which are too high can be present at such points. It is therefore not surprising that decomposition of ethylene or of the polymerizates takes place preferentially in or at the non-operating side branches of the reactor - the so-called clearances (dead spaces). From extensive experiments these clearances could be unequivocally proved to be the starting point for the decompositions. If decompositions have started at one point in the reactor, then they extend to the whole reactor and the reaction must be interrupted.

In connection with this, it is understood that the conventional tube form reactors for polymerization are fitted with a large number of connections, among others, for the introduction of cold gas and for the fitting of safety valves. As a rule, only a few of the available cold gas valves are usually in operation at any one time. In accordance with the required reaction conditions, when cold gas is introduced through them, no superheating at these introduction points can occur. The cold gas which is introduced, of course, markedly disturbs the temperature profile over the tube cross-section. However, at the same time, an increase in the flow turbulence takes place causing an equalization of the temperature over the reactor cross-section. On the other hand, the unused connection points form clearances, at which, as already mentioned, the danger of the appearance of superheating and heat congestion is possible. The closing of the unneeded and unused branches with dummy plugs is one precaution which can be applied to avoid these clearances or "dead spaces". However, a solution of the problem in this manner is not technically practicable. Any change in the production program would necessitate a protracted reconstruction of the reactor in order to transpose the dummy plugs. Moreover, the clearances at the safety valves, which must remain open, would not be removed.

It is therefore an object of the invention to control the polymerization of ethylene, alone or together with comonomers so that no decomposition takes place, regardless of the speed of flow of the reaction mixture, in or at the clearances. It is further an aspect of the invention to provide for optimal conductance of the reaction and to provide for a speedy conversion of the reactor for the preparation of various and different products.

In accordance with the invention, this object is solved by means of a process for the polymerization of ethylene alone or together with comonomers in a tube form reactor, equipped with side branches, at about 100 to 350° C and about 500 to 5,000 bar pressure in the presence of initiators and, if necessary, moderators. It is characterized by the fact that the side branches present in the reactor have an inner diameter which is about 12 mm or less for a "flow number" of the reaction mixture in the reactor of 0.20 m²/sec. to 0.55 m²/sec. and is less than about 10 mm for a flow number of the reaction mixture above 0.55 m²/sec.

The meaning of flow-number, in the invention presented, is the product of the inner diameter of the tube reactor and the speed of flow.

In the case of tube reactors with variable inner diameter, the relationship between flow number and inner diameter of the side branches must be fulfilled on each side of the reactor.

An important characteristic of the process according to the invention is the maintainance of the flow number of the reaction mixture independent of the content of the mixture. Correspondingly, the new procedure can be employed not only for the polymerization of ethylene alone, but also for the polymerization of ethylene with comonomers such as α-olefins (e.g. propene, butene-1), vinylesters (e.g. vinylacetate), acrylic acid, methacrylic acid and their derivatives, vinylethers, vinyl halides, styrene or carbon monoxide. The comonomers named, are usually inserted with ethylene in an amount up to 30% relative to the combined mixture of the reactants.

The process of the invention is conducted in tube reactors of conventional design. Reactors of this type are generally several hundred meters long and have, for the conductance of the reaction on a commercial scale, a diameter of 20 to 75 mm.

The polymerization takes place at temperatures of about 100° to 350° C and pressures of about 500 to 5,000 bar. The temperature to be maintained depends on, among other things, the type of initiators used to start the polymerization. The following substances are employed as initiators e.g. oxygen, peroxides, azo compounds or also Ziegler catalysts (organometallic mixed catalysts).

The addition of moderators, in order to regulate the molecular weight, is possible. The following substances can be used for this purpose - aliphatic hydrocarbons, hydrocarbon halides, aliphatic alcohols, aliphatic aldehydes and ketones or substituted aromatic compounds.

The invention is described below in more detail by means of Examples.

EXAMPLES

Ethylene is caused to react, in the experimental series A and B, in tube reactors at a pressure between 1,500 and 3,000 bar and temperatures of between 100° to 350° C. The flow number of the reaction mixture, consisting ethylene, oxygen as initiator and a saturated hydrocarbon as modifier was kept at between 0.20 m²/sec. to 0.55 m²/sec. The time to carry out the experiments was the same in both series.

The tube form side branches of the reactor, for the introduction of cold gas and for the connection of safety devices, had, in experimental series A, an inner diameter of more than 20 mm. This tube diameter lies outside the range to be observed according to the process of the invention. In the case of the experimental series B, the inner diameter of the tube form side branches, for the introduction of cold gas, was 12 mm, in accordance with the new procedure. The side branches for the attachment of safety valves had, on the other hand, an inner diameter of more than 20 mm. The result of the experiments is reproduced in the table below:

| Experimental | No. of decompositions in/or at clearances | |
|---|---|---|
| Series | Cold gas branches | safety valves |
| A | 8 | 6 |
| B | 0 | 5 |

As can be seen, decompositions take place with flow numbers of 0.20 m²/sec. to 0.55 m²/sec. in and at side branches having an inner diameter greater than 12 mm. (experimental series A and the safety valves in experimental series B). On the other hand, decompositions do not occur, if - as in the case of the cold gas branches of experimental series B - the conditions, in accordance with the process of the invention, are observed.

Modifications in the above described embodiments may occur to those skilled in the art. It is intended to cover all such modifications which do not depart from the spirit and scope of the invention as defined by the claims appended hereto.

What is claimed is:

1. In a process for the polymerization of ethylene in a tube form reactor having side branches opening into the reactor, the side branches having a diameter of not more than about 12 mm, and wherein polymerization is carried out at a pressure between about 500 and 5,000 bar and a temperature between about 100° and 350° C, the improvement comprising maintaining the flow number at a value not less than about 0.20 m²/sec, said flow number being defined as the product of reactor internal diameter and the rate of flow of the reaction through the reactor.

2. The process according to claim 1 wherein the flow number is maintained at not less than about 0.55 m²/sec and wherein the side branches have a diameter of not more than about 10 mm.

3. The process according to claim 1 wherein the ethylene is polymerized with a comonomer.

* * * * *